Sept. 20, 1971  C. L. FOREHAND  3,605,971
TAXICAB FARE BANK

Filed March 14, 1969  2 Sheets-Sheet 1

Corry L. Forehand
INVENTOR.

BY
Attorneys

Sept. 20, 1971  C. L. FOREHAND  3,605,971
TAXICAB FARE BANK
Filed March 14, 1969  2 Sheets-Sheet 2
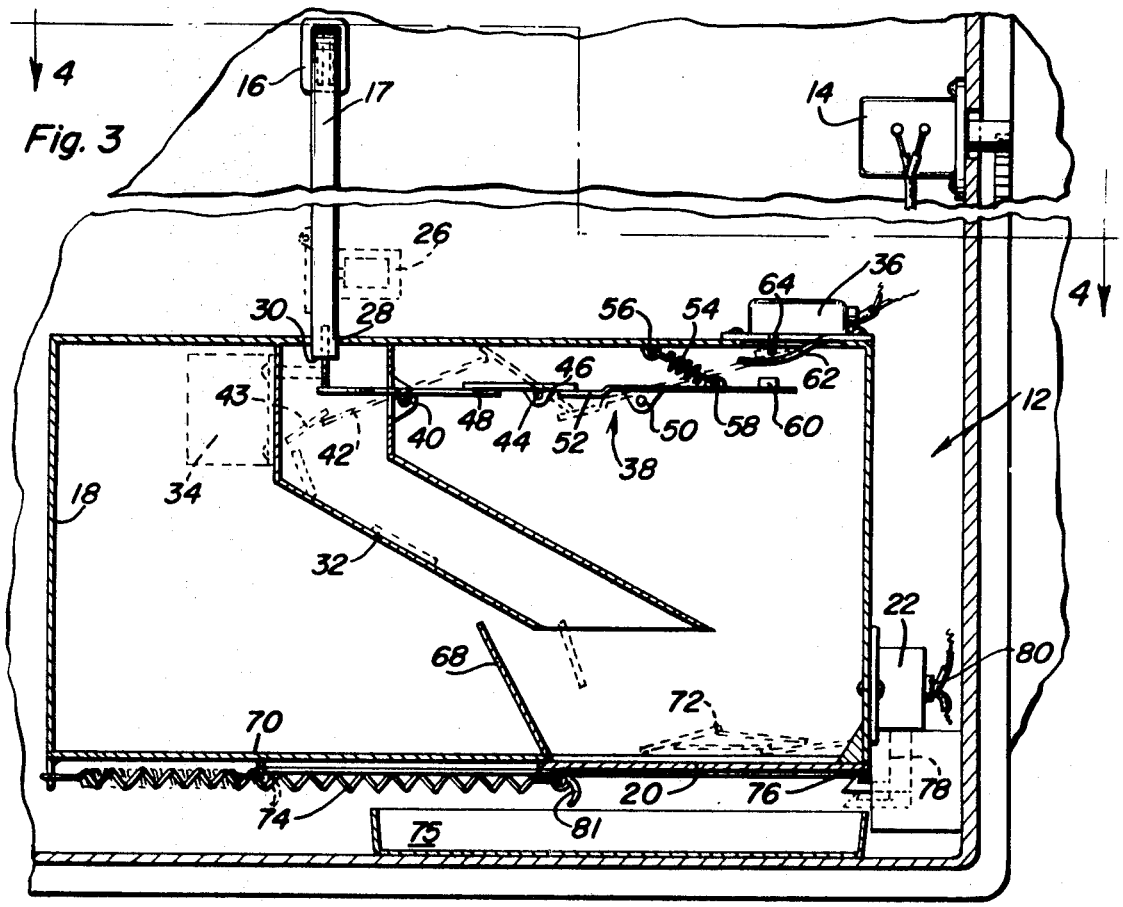
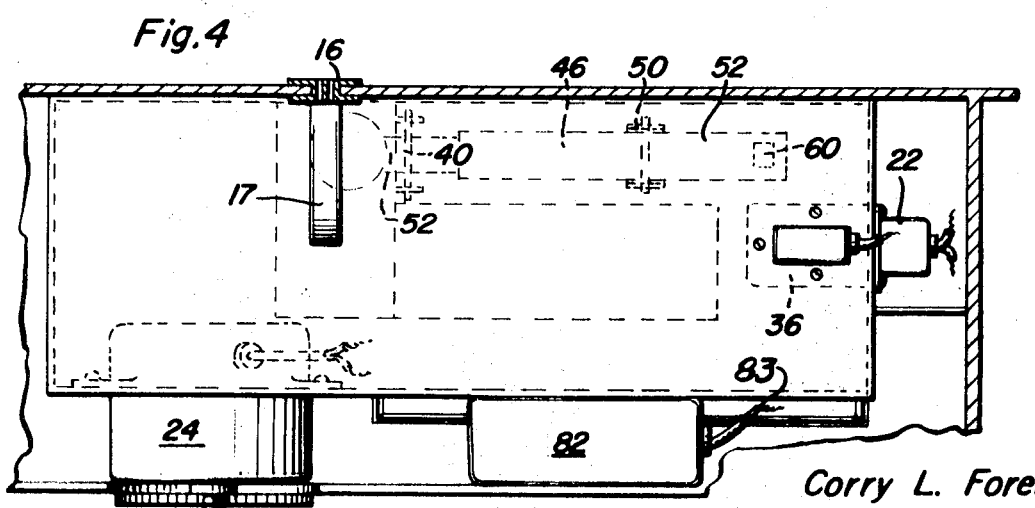
Corry L. Forehand
INVENTOR.

United States Patent Office 3,605,971
Patented Sept. 20, 1971

3,605,971
TAXICAB FARE BANK
Corry L. Forehand, 2106 Maryland Ave. NE., Apt. 12,
Washington, D.C. 20002
Filed Mar. 14, 1969, Ser. No. 807,379
Int. Cl. G07f 5/10
U.S. Cl. 194—9                                        4 Claims

ABSTRACT OF THE DISCLOSURE

A fare receptacle is housed within a vehicle door. A slot disposed on the exterior door panel permits the insertion of fare money therein. Upon deposit of the proper fare, the vehicle door is opened thereby permitting passenger entrance. Further, a security timer is connected to a money return door in the receptacle thereby permitting retrieval of deposited fare money only at a particular time of day.

---

The present invention relates to safes and more particularly to a fare responsive safe for controlling entrance to a vehicle, the safe having timer means allowing the opening thereof at preselected time of day.

Current statistics make it quite apparent that crime including robbery is on the rise. As a direct result of this unfortunate situation, drivers of public conveyance vehicles suffer frequent robberies of their fares, as well as facing the danger of bodily harm. In a growing number of cities a solution to this problem is being experimented with. The solution includes a plan whereby passengers must have exact change before boarding the conveyance vehicle thus obviating the necessity of the vehicle operator or driver to carry a substantial amount of cash for change. At this time, the solution is most prevalent with public buses. The fare boxes of the buses are being so constructed that the fare deposited remains in the box and cannot be retrieved by the driver. Thus, robbery of the driver is discouraged. However, this practice has resulted in a shift of robberies from bus drivers to taxicab operators.

The taxicab operator is at a disadvantage because generally the fare is paid at the termination of a trip. Thus, the cab operator finds that he frequently takes a passenger to a destination only to have the passenger leave the cab without paying the fare. It would be desirable to have a system which requires depositing of the fare prior to the ride. Of course, this practice would require that the fare be estimated in accordance with the destination of the passenger which is made apparent to the cab operator when he is hailed. It is contemplated that the present invention be utilized with a system in which cab fare is determined in accordance with zone travel as opposed to metered travel. By utilizing the present invention, the passenger door to the vehicle does not become unlocked until the proper fare has been deposited within a slot located on the exterior panel of the vehicle door.

More importantly, the need arises for a locked fare receptacle or cash box. The present invention achieves these ends by providing a locked receptacle disposed in the door structure of the vehicle. The receptacle is normally locked and includes a cash return drawer which is controlled by an electric timer. Therefore, the cash cannot be removed from the receptacle until the preselected time of day is reached.

As will be appreciated, the purpose of the present invention is twofold. Firstly, the invention precludes entry of a "freeloader" into the cab because the deposit of the fare is required to unlock the cab door. Secondly, a cash box is provided for collecting the deposited fare, the cash box being openable only when a control timer reaches a preselected time of day.

These together with other objects and advantages which will become subsequently apparent reside in the details of construction and operation as more fully hereinafter described and claimed, reference being had to the accompanying drawings forming a part hereof, wherein like numerals refe rto like parts throughout, and in which:

FIG. 3 is a sectional view taken along a plane passing through section line 3—3 of FIG. 1.

FIG. 4 is a sectional view taken along a plane passing through section line 4—4 of FIG. 3.

Figure 1:
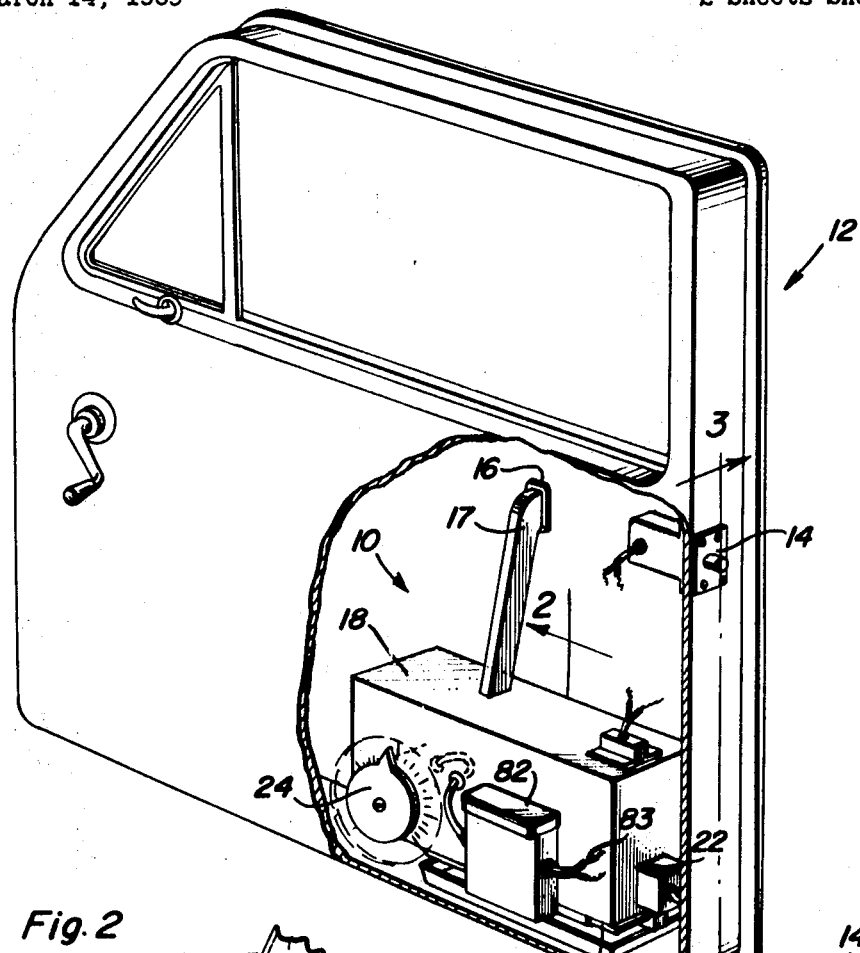
FIG. 1 is a cutaway view illustrating in perspective the components of the present invention.
Figure 2:
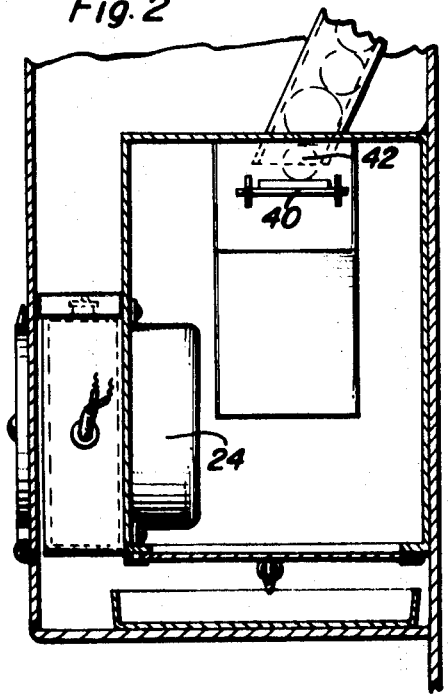
FIG. 2 is a transverse sectional view taken along a plane passing through section line 2—2 of FIG. 1.

Referring to the drawings and more particularly FIG. 1 thereof, the fare bank of the present invention is generally indicated by reference numeral 10 and is seen to be disposed within the structure or frame of a vehicle door 12, which for purposes of the present discussion is a passenger entry door of a taxicab. The door is principally of conventional design but includes a door lock 14 located in the usual position but controlled to open only upon insertion of fare money into a slot 16 disposed along the external panel of the door 12. The slot communicates with a chute 17 which terminates at a lower end thereof in a lock receptacle or box 18. The lower wall of the box 18 includes a normally closed slidable door 20 which is retained in a closed position by an electromagnetic latching device 22. The latter device is controlled by an electric timer 24 and in operation thereof, upon the disposition of the timer at a preselected time of day, the electromagnetic latching device 22 is released thereby opening the door 20 so that collected money will fall out of the box.

As illustrated in FIG. 3, a slug rejector 26 may be mounted to communicate with the chute 17, the rejector being of the form normally used in vending machines. The operation of the slug rejector insures that only proper cash can be deposited in the receptacle 18.

Referring to FIG. 3, the structure of the fare bank is illustrated in greater detail to include a lower end portion 28 of the chute 17. It will be noted that the present embodiment is explained in terms of a mechanism for receiving coins. However, a receiving slot and associated apparatus for accepting bills is contemplated. Such an apparatus would be of the form conventionally used by vending machines which accept bills.

The lower open end 30 of the chute 17 communicates with a second downwardly and inclined chute 32 for guiding deposited coins in a preselceted space of the box 18. A conventional meter or detecting device 34 (shown schematically) is mounted on the second mentioned chute, and an indicating device can be coupled thereto so as to permit the cab operator to know how much fare has been deposited.

It is contemplated that such a conventional sensing device or metering device be of the type used in vending machines which enable the machine mechanism to dispense a particular article at a certain price, once coins having the value has been deposited.

A rocking arm assembly generally indicated by 38 is provided to cause closing of switch 36 upon depositing of coins into chute 17.

A hinge 40 is mounted to the wall of the second mentioned chute 32, the hinge mounting a first rocking arm 42. The rocking arm includes a circular plate portion in the interior of the chute 32 while an outward portion of the arm 42 extends outwardly from the chute 32 in normally parallel spaced relation with the top wall of receptacle 18. The second hinge 44 is connected to the lateral wall of receptacle 18 and mounts a second rocking arm 46. The latter mentioned rocking arm overlies an adjacent end of the first mentioned rocking arm 42, as indicated by 48. Thus, when a coin 43 falls upon the rocking arm 42, motion is transmitted to the second mentioned rocking arm which is displaced in an opposite sense from the first rocking arm.

A third hinge 50 is similarly mounted to the aforementioned hinges 40 and 44. A third rocking arm 52 is mounted in underlying relation with an adjacent end portion of the second mentioned rocking arm 46. A spring 54 is connected between the top wall of the receptacle (56) and an intermediate point (58) on the rocking arm 52 to retain the latter in a normally horizontal position. Thus, upon displacement of the first mentioned rocking arm 42, motion is translated to the third rocking arm by the second rocking arm so that the third rocking arm is rotated in the same sense as the first mentioned rocking arm 42. After being actuated, the free end of the third rocking arm, having a lug 60 attached thereto, is displaced upwardly to contact a cantilevered spring 62 which overlies the switch actuator 64 of the switch 36. Upon sufficient displacement of the cantilevered spring 62 the switch is closed and a circuit is completed as explained hereinafter through the switch 36 and the electromagnetic lock 14 to open the latter lock and permit entrance into the vehicle. It is contemplated that the switch 36 be of the conventional microswitch type.

A partition 68 rises above the interior surface of the lower receptacle wall 70 thereby restricting the flow of coins to a particular area of the receptacle as indicated by 72. The sliding panel door 20 previously mentioned normally retains the receptacle 18 in a secured and locked state. A coil spring 74 is connected between the lower receptacle wall 70 and the sliding door 20. In this respect, the spring acts against the electromagnetic latching or locking device 22 which normally retains the sliding door 20 in a closed position. Therefore, when the latch or lock is released, the coil spring 74 will force the sliding door to open thereby causing the exit of collected fare into a sliding tray 75 resting on the base of the door. Although not shown, the interior door panel includes an elongated slot to permit withdrawal of the tray and resetting of the sliding door 20 to its initial position by exerting digital force on accessible finger hook 81. The electromagnetic lock 22 is mounted to the lower exterior of a transverse receptacle wall. The lock includes a beveled latch 78 normally retained in engaged position with a bead 76 formed on the sliding door. When the timer 24 reaches a preselected time of day, the electromagnetic lock 22 is actuated through input electrical wires 80 thereby resulting in the downward displacement of the latch 78. The electromagnetic lock 22 will be of a conventional design having a solenoid operated latch 78. Referring to FIG. 1 there will be noticed a battery pack 82 connected to the electric timer 24 to provide energization thereto. Of course if so desired the electric timer may be directly connected to the automotive electrical system or a battery recharging device may be incorporated in the battery pack 82, the recharging power being provided through electrical terminals 83.

Figure 5:
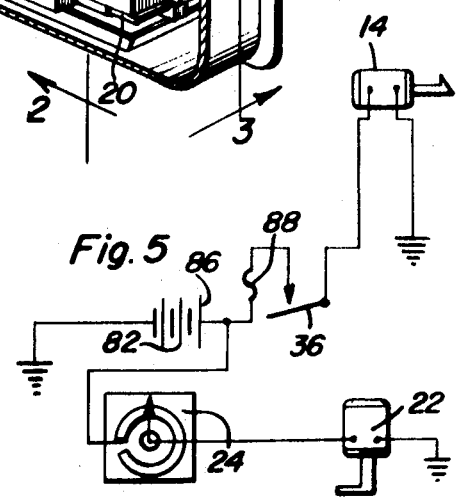
FIG. 5 is an electrical schematic diagram illustrating the control mechanism of the present invention.

In order to understand the electrical operation of the present invention reference is made to FIG. 5. The battery pack 82 is represented and shows the negative terminal being connected to ground. The positive terminal 86 is connected to switch 36 through a fuse 88. The switch in turn is serially connected to the grounded electromagnetic door lock 14. Thus, upon closing of switch 36 which occurs upon the depositing of coins in slot 16 as hereinbefore described, current is caused to flow through the lock 14 which is of the conventional solenoid design. The positive terminal 86 of battery pack 82 is also connected in parallel with a series path comprising the electric timer 24 and the electromagnetic locking device 22. The timer includes electrical contacts therein which are closed when a preselected time of day is reached. This causes current to flow from the positive terminal 86 to ground through the series connection of the timer 24 and the electromagnetic device 22 characterized as a conventional solenoid type lock device.

Although the present invention has been described in terms of a safety device to be used in a taxicab environment, it will be appreciated that the mechanics and electrical controls for the present invention may be incorporated to control other suitably responsive devices.

Further, the system may be mounted in another part of the vehicle other than the door, but to be operated in the same manner. For example, the fare slot may be disposed in the backrest of the front seat, where it is accessible to an entering passenger. In this mode, no control of the door lock is effected. Rather, the driver will not operate the vehicle unless the proper fare has been deposited. The fare receptacle 18 would be built into the front seat so that deposited fare could be collected therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What is claimed as new is as follows:

1. A fare deposit security system for a public conveyance vehicle, the system comprising a money slot mounted to the vehicle and accessible to a passenger, a fare receptacle for receiving deposited fare, money return means mounted in the receptacle for permitting retrieval of deposited money by authorized persons, lock means normally retaining the money return in a closed position, and timer means for causing release of the lock means at preselected time intervals, the return means being caused to open in response to lock release, means for sensing deposited money, switch means being responsive to actuation of the sensing means, and a vehicle door lock connected to the switch, the lock normally being in a locked position, the lock being retracted to an open position in response to switch closure.

2. The system of claim 1 wherein the door lock is an electro-mechanical device having a power responsive latch, the system further including a source of electrical power, the switch and door lock being connected in circuit to effect lock retraction in response to switch closure.

3. The system set forth in claim 2 wherein the timer means is characterized as an electro-mechanical device for issuing an electrical command signal when a preselected time is reached, the timer means having an output connected to the lock means which normally retains the money return means in a closed position, the latter lock means being an electro-mechanical device having a power responsive latch connected in circuit with the timer means output and the electrical source, the latter lock means being openable in response to the command signal from the timer means.

4. A security system to be enclosed within a vehicle door, the system comprising a money slot mounted to the exterior of the door, a fare receptacle for receiving money deposited by a passenger in the slot, means for sensing deposited money, switch means being responsive to actuation of the sensing means, and a vehicle door lock normally being in a locking position, the lock being retracted to an open position in response to switch closure.

References Cited

UNITED STATES PATENTS

| | | | |
|---|---|---|---|
| 1,824,502 | 9/1931 | Robinson | 232—1D |
| 2,029,272 | 1/1936 | Miller | 70—268 |
| 2,030,219 | 2/1936 | Meilink | 70—268X |
| 748,909 | 1/1904 | Abizaid | 194—51 |
| 1,069,558 | 8/1913 | Majors | 194—9 |
| 2,145,314 | 1/1939 | Murtaugh, Jr. | 70—269X |
| 2,591,288 | 4/1952 | Pitchford | 194—9T |

SAMUEL F. COLEMAN, Primary Examiner